United States Patent
Alan

(10) Patent No.: US 12,041,672 B2
(45) Date of Patent: Jul. 16, 2024

(54) TELEMATIC DEVICE WITH MULTIPLE SUBSCRIBER IDENTITY MODULES

(71) Applicant: QUAKE GLOBAL, INC., San Diego, CA (US)

(72) Inventor: Neil A. Alan, San Diego, CA (US)

(73) Assignee: Quake Global, Inc., San Diego, CA (US)

( * ) Notice: Subject to any disclaimer, the term of this patent is extended or adjusted under 35 U.S.C. 154(b) by 426 days.

(21) Appl. No.: 17/551,626

(22) Filed: Dec. 15, 2021

(65) Prior Publication Data
US 2023/0189354 A1 Jun. 15, 2023

(51) Int. Cl.
*H04W 76/10* (2018.01)
*H04W 8/20* (2009.01)

(52) U.S. Cl.
CPC .......... *H04W 76/10* (2018.02); *H04W 8/20* (2013.01)

(58) Field of Classification Search
CPC ........ H04W 8/20; H04W 76/10; H04W 76/27
See application file for complete search history.

(56) References Cited

U.S. PATENT DOCUMENTS

| | | | | |
|---|---|---|---|---|
| 2007/0260363 | A1* | 11/2007 | Miller | G06F 16/2365 701/2 |
| 2013/0252552 | A1* | 9/2013 | Vitkus | H04Q 9/00 455/41.2 |
| 2016/0262201 | A1* | 9/2016 | Visuri | H04W 72/542 |
| 2022/0167159 | A1* | 5/2022 | Ning | H04W 12/71 |
| 2022/0377658 | A1* | 11/2022 | Gudivada | H04W 48/16 |
| 2023/0067933 | A1* | 3/2023 | Guo | H04W 16/14 |

* cited by examiner

*Primary Examiner* — Mahran Y Abu Roumi
(74) *Attorney, Agent, or Firm* — Procopio, Cory, Hargreaves & Savitch LLP

(57) ABSTRACT

Telematic device with multiple subscriber identity modules (SIMs). The telematic device may execute software that, when establishing a new connection, executes a battery-saving algorithm. The algorithm may comprise, in each of one or more iterations, attempting to connect to a wireless communication network via a cellular communications interface using a SIM profile. When the attempt fails, the algorithm determines whether or not the telematic device is being powered by a battery. When the telematic device is not being powered by the battery, a retry interval is adjusted according to a first back-off scheme. On the other hand, when the telematic device is being powered by the battery, the retry interval is adjusted according to a second back-off scheme (e.g., which is more aggressive than the first back-off scheme to conserve the battery). The algorithm then waits for a duration indicated by the retry interval before the next iteration.

20 Claims, 2 Drawing Sheets

TELEMATIC DEVICE WITH MULTIPLE SUBSCRIBER IDENTITY MODULES

BACKGROUND

Field of the Invention

The embodiments described herein are generally directed to telematic devices, and, more particularly, to telematic devices with multiple Subscriber Identity Modules (SIMs).

Description of the Related Art

Telematic devices may be equipped with multiple Subscriber Identity Module (SIM) slots. For example, a typical telematics device may comprise or consist of two SIM slots. Each SIM slot is configured to hold a SIM card. A SIM card is a type of smart card comprising an integrated circuit that executes a card operating system (COS). The card operating system of a SIM card securely stores a SIM profile. Alternatively, a telematic device may be configured to utilize an embedded SIM (eSIM). An eSIM performs the same function as a SIM card, but is embedded directly into the telematic device on a reprogrammable chip. An eSIM can be provisioned remotely and enables the telematic device to easily switch between SIM profiles without the need of a physical SIM slot or SIM card.

A SIM profile generally includes network-specific information, including an international mobile subscriber identity (IMSI) number and an associated key that are used to identify and authenticate a subscriber in a wireless communication network. The SIM profile may also include carrier-specific information for the entity that provides wireless communication services to the telematic device.

Under some circumstances, when a telematic device switches from a first SIM profile to a second SIM profile, the telematic device may be unable to connect to the wireless communication network using the second SIM profile. As a result, the telematic device may enter a disconnected state in which the telematic device is not connected to the desired wireless communication network. In addition, many telematic devices rely, at least on some occasions, on a limited power supply, such as a battery. In this case, a telematic device that continually attempts to connect to a wireless communication network may quickly drain the battery.

SUMMARY

Accordingly, systems, methods, and non-transitory computer-readable media are disclosed for a battery-saving algorithm, in a multi-SIM telematic device, for attempting a connection to a wireless communication network.

In an embodiment, a telematic device comprises: a battery; a memory; a cellular communications interface; at least one hardware processor; and software stored in the memory and configured to, when executed by the at least one hardware processor, in response to a determination to establish a connection, in each of one or more iterations, attempt to connect to a wireless communication network via the cellular communications interface using a Subscriber Identity Module (SIM) profile, and, when the attempt fails, determine whether or not the telematic device is being powered by the battery, when determining that the telematic device is not being powered by the battery, adjust a retry interval according to a first back-off scheme, when determining that the telematic device is being powered by the battery, adjust the retry interval according to a second back-off scheme that increases the retry interval at a faster rate than the first back-off scheme, and wait for a duration indicated by the retry interval until starting a next one of the one or more iterations.

Attempting to connect to the wireless communication network may comprise attempting to connect to the wireless communication until a valid connection is established or a maximum number of retries is reached.

The memory may store a value of a retry scale, wherein the duration indicated by the retry interval is a value of the retry interval in a unit of time indicated by the stored value of the retry scale. The value of the retry scale may be configurable.

The software may be further configured to, in each of the one or more iterations, select the SIM profile from a plurality of available SIM profiles prior to the attempt. The one or more iterations may be a plurality of iterations, wherein, in at least one of the plurality of iterations, selecting the SIM profile comprises selecting a different one of the plurality of available SIM profiles than was selected in an immediately preceding one of the plurality of iterations. In an initial one of the one or more iterations, selecting the SIM profile may comprise selecting a different one of the plurality of available SIM profiles than a last SIM profile to be used for a valid connection.

The telematic device may comprise at least two SIM slots, wherein each of the at least two SIM slots is configured to receive a SIM card that securely stores a SIM profile.

The telematic device may further comprise an embedded SIM (eSIM) configured to securely store at least one SIM profile.

The first back-off scheme may comprise incrementing a value of the retry interval by a constant amount. The second back-off scheme may comprise incrementing a value of the retry interval according to a Fibonacci sequence.

In an embodiment, a method comprises using at least one hardware processor to, in response to a determination to establish a connection, in each of one or more iterations: attempt to connect to a wireless communication network via a cellular communications interface of a telematic device using a Subscriber Identity Module (SIM) profile; and, when the attempt fails, determine whether or not the telematic device is being powered by a battery, when determining that the telematic device is not being powered by the battery, adjust a retry interval according to a first back-off scheme, when determining that the telematic device is being powered by the battery, adjust the retry interval according to a second back-off scheme that increases the retry interval at a faster rate than the first back-off scheme, and wait for a duration indicated by the retry interval until starting a next one of the one or more iterations.

In an embodiment, a non-transitory computer-readable medium has instructions stored therein, wherein the instructions, when executed by a processor, cause the processor to: attempt to connect to a wireless communication network via a cellular communications interface of a telematic device using a Subscriber Identity Module (SIM) profile; and, when the attempt fails, determine whether or not the telematic device is being powered by a battery, when determining that the telematic device is not being powered by the battery, adjust a retry interval according to a first back-off scheme, when determining that the telematic device is being powered by the battery, adjust the retry interval according to a second back-off scheme that increases the retry interval at a faster rate than the first back-off scheme, and wait for a duration indicated by the retry interval until starting a next one of the one or more iterations.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

In an embodiment, systems, methods, and non-transitory computer-readable media are disclosed for a battery-saving algorithm, in a multi-SIM telematic device, for retrying a connection to a wireless communication network. After reading this description, it will become apparent to one skilled in the art how to implement the subject matter in various alternative embodiments and alternative applications. However, although various embodiments of the present subject matter will be described herein, it is understood that these embodiments are presented by way of example and illustration only, and not limitation. As such, this detailed description of various embodiments should not be construed to limit the scope or breadth of the present disclosure as set forth in the appended claims.

1. Example Telematic Device

Figure 1:
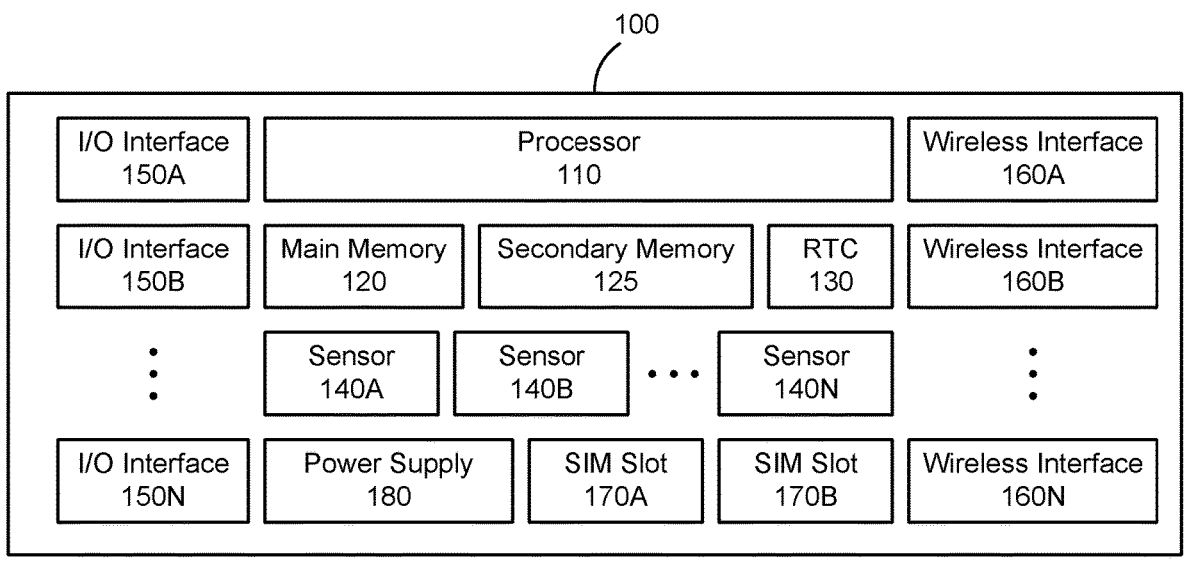
FIG. 1 illustrates an example telematic device, according to an embodiment.

FIG. 1 is a block diagram illustrating an example telematic device 100 that may execute the disclosed algorithm, according to an embodiment. However, it should be understood that other systems and/or architectures may be used with the disclosed algorithm, as will be clear to those skilled in the art. Examples of a telematic device 100 include the QConnect™ by Quake Global, Inc., of San Diego, California, the HPRO-4G, manufactured by Quake Global, Inc, any other remote asset-tracking device, and/or the like.

Telematic device 100 may comprise one or more processors 110. Processor(s) 110 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a secondary processor subordinate to the main processing system (e.g., back-end processor), an additional microprocessor or controller for dual or multiple processor systems, and/or a coprocessor. Such additional processors may be discrete processors or may be integrated with processor 110. Examples of processors 110 include, without limitation, any of the processors (e.g., Pentium™, Core i7™, Xeon™, etc.) available from Intel Corporation of Santa Clara, California, any of the processors available from NXP Semiconductors N.V. of Eindhoven, Netherlands, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, and/or the like.

Processor 110 may be communicatively connected to one or more other components of telematic device 100 via a communication bus (not shown). The communication bus may include a data channel for facilitating information transfer between components. Furthermore, the communication bus may provide a set of signals used for communication with processor(s) 110, including a data bus, address bus, and/or control bus. The communication bus may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPM), IEEE 696/S-100, and/or the like.

Telematic device 100 may comprise a main memory 120, and may also include a secondary memory 125. Main memory 120 provides storage of instructions and data for programs executing on processor(s) 110, such as the disclosed algorithm. It should be understood that programs stored in main memory 120 and/or secondary memory 125 and executed by processor 110 may be written and/or compiled according to any suitable language, including without limitation C/C++, Java, JavaScript, Perl, Visual Basic, .NET, and the like. Main memory 120 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read-only memory (ROM). In an embodiment, main memory 120 comprises Double Data Rate Type 3 (DDR3) SDRAM.

Secondary memory 125 may comprise an internal medium and/or a removable medium. Secondary memory 125 is a non-transitory computer-readable medium having computer-executable code (e.g., implementing the disclosed algorithm) and/or other data (e.g., variables and other parameters used by the disclosed algorithm) stored thereon. The computer-executable code and data, stored on secondary memory 125, is read into main memory 120 for execution by processor(s) 110. Secondary memory 125 may include semiconductor-based memory, such as programmable read-only memory (PROM), erasable programmable read-only memory (EPROM), electrically erasable read-only memory (EEPROM), and flash memory (e.g., a solid state drive). In an embodiment, secondary memory 125 comprises NAND and/or NOR flash memory.

Telematic device 100 may comprise a real-time clock (RTC) 130. Real-time clock 130 may comprise an integrated circuit that is dedicated to keeping time, for example, using a crystal oscillator. Real-time clock 130 may comprise or be connected to a dedicated battery, such that real-time clock 130 can keep time even when telematic device 100 has no power. Processor(s) 110 may use real-time clock 130 to keep time, trigger time-based events, and synchronize processes and other components (e.g., Global Positioning System (GPS) receiver) in telematic device 100.

Telematic device 100 may comprise one or a plurality of sensors 140, which are illustrated as sensors 140A-140N. Sensor(s) 140 may comprise a gyroscope that measures angular velocity of telematic device 100, and accelerometer that measures linear acceleration of telematic device 100, a Global Navigation Satellite Systems (GNSS) receiver to identify the location (e.g., coordinates comprising latitude, longitude, and elevation) of telematic device 100, a temperature sensor to measure the internal and/or external temperature of telematic device 100, and/or the like. In an embodiment with a GNSS receiver, the GNSS receiver may utilize GPS, GLONASS, BeiDou, and/or Galileo to determine the location of telematic device 100.

Telematic device 100 may comprise one or a plurality of input and/or output (I/O) interfaces 150, which are illustrated as I/O interfaces 150A-150N. Each I/O interface 150 may comprise a physical port or socket that is configured to receive a connector on one end of a wire, cable, or other physical connection. I/O interface(s) 150 may comprise an Ethernet port (e.g., 10/100/1000 Mbps Ethernet), Automotive Ethernet 100Base-T2, a Controller Area Network (CAN) port, a serial port complying with Recommended Standard 232 (RS-232), an analog and/or digital interface (e.g., for connecting an external antenna), a port for an input device (e.g., keyboard, mouse, etc.) and/or output device (e.g., display monitor, printer, etc.), and/or the like.

Telematic device 100 may comprise one or a plurality of wireless interfaces 160, which are illustrated as wireless interfaces 160A-160N. Each wireless interface 160 may comprise or be communicatively connected to one or more radio frequency (RF) antennae configured to perform wireless communication according to a wireless communication technology. For example, wireless interface(s) 160 may include a cellular communications interface, a Wi-Fi™ interface, a Bluetooth™ Low Energy (BLE) interface, and/or the like.

Telematic device 100 may comprise at least two SIM slots 170, which are illustrated as SIM slots 170A and 170B. Each SIM slot 170 may be configured to receive and hold a SIM card. When only a single SIM slot 170 holds a SIM card, the cellular communications interface (e.g., 160A) may be configured to use the SIM profile of that SIM card to perform cellular communications. When two or more SIM slots 170A and 170B hold respective SIM cards, the cellular communications interface may be configured to use the SIM profile of either SIM card to perform cellular communications, and switch between the SIM profiles to be used for cellular communications under control of processor(s) 110.

Alternatively or additionally, telematic device 100 may comprise an eSIM. The SIM profile of the eSIM may be reprogrammed as needed under control of processor(s) 110. The cellular communications interface (e.g., 160A) may be configured to use a SIM profile of the eSIM, and switch between SIM profiles of the eSIM to be used for cellular communications under control of processor(s) 110.

Software (e.g., computer-executable code and/or data) may be downloaded or otherwise transferred to telematic device 100 via one or more of I/O interfaces 150 (e.g., Ethernet interface) and/or wireless interfaces 160 (e.g., cellular communications interface, Wi-Fi™ interface, BLE interface, etc.). This software may comprise the disclosed algorithm and/or one or more other processes (e.g., embodied as firmware), and/or updates to the disclosed algorithm and/or one or more other processes. The transferred software may be stored in secondary memory 125, and loaded into main memory 120, as needed, to be executed by processor(s) 110.

Telematic device 100 may comprise a power supply 180. Power supply 180 may comprise a power port and internal backup battery with automatic switchover. Telematic device 100 may be connected to an external power supply via the power port. The external power supply may be a power grid (e.g., via a standard power outlet), a vehicle or drone battery, an external battery, a generator, and/or the like. The internal backup battery may be a rechargeable battery (e.g., lithium battery). Telematic device 100 may comprise a battery management process and/or hardware component that automatically charges the internal backup battery with electric power when the power port is connected to an external power supply, and, when power from the external power supply is interrupted (e.g., due to a fault, electrical uncoupling, etc.), automatically switches to powering the components of telematic device 100 via the discharge of electrical power from the internal backup battery.

It should be understood that telematic device 100 may be mounted or embedded in another device, machine, or other asset, including a mobile asset, such as a vehicle or drone. For example, telematic device 100 may be used for remote asset tracking. In particular, telematic device 100 may collect data from sensors 140 or other sensors in the asset, from external components (e.g., Electronic Control Unit (ECU) of a vehicle) in the asset via a CAN bus connected to a CAN port of an I/O interface 150, Ethernet connection to an Ethernet port of an I/O interface 150, and/or the like, from external components in the asset via a wireless interface 160 (e.g., Wi-Fi™ and/or BLE interface), from other entities (e.g., other vehicles via vehicle-to-vehicle communication) using a wireless interface 160, and/or the like. Telematic device 100 may then store the collected data (e.g., in secondary memory 125), pre-process and/or analyze the collected data, and/or transmit the collected data to an external remote system via a wireless interface 160 (e.g., a cellular communications interface). In this manner, data may be collected and/or analyzed for one or a plurality of assets (e.g., a fleet of vehicles) by the remote system, which may be a server, cloud-based platform, or the like. The data that may be collected, tracked, monitored, and/or otherwise analyzed for a given asset may include outputs of sensors within the asset, locations of the asset, and/or the like.

2. Example Algorithm

Embodiments of a battery-saving algorithm for attempting a connection to a wireless communication network, in a multi-SIM telematic device 100, will now be described in detail. It should be understood that the described algorithm may be embodied in one or more software modules that are stored in secondary memory 125, loaded into main memory 120, and executed by processor(s) 110 of telematic device 100. The described processes may be implemented as instructions represented in source code, object code, and/or machine code. These instructions may be executed directly by hardware processor(s) 110, or alternatively, may be executed by a virtual machine operating between the object code and hardware processor(s) 110.

Alternatively, the described processes may be implemented as a hardware component (e.g., general-purpose processor, integrated circuit (IC), application-specific integrated circuit (ASIC), digital signal processor (DSP), field-programmable gate array (FPGA) or other programmable logic device, discrete gate or transistor logic, etc.), combination of hardware components, or combination of hardware and software components. To clearly illustrate the interchangeability of hardware and software, various illustrative subprocesses are described herein generally in terms of their functionality. Whether such functionality is implemented as hardware or software depends upon the particular application and design constraints imposed on the overall system. Skilled persons can implement the described functionality in varying manners for each particular application, but such implementation decisions should not be interpreted as causing a departure from the scope of the subject matter. In addition, the grouping of functions within a subprocess is for ease of description. Specific functions can be moved from one subprocess to another without departing from the scope of the subject matter.

Furthermore, while the algorithm, described herein, is illustrated with a certain arrangement and ordering of subprocesses, the algorithm may be implemented with fewer, more, or different subprocesses and a different arrangement and/or ordering of subprocesses. In addition, it should be understood that any subprocess, which does not depend on the completion of another subprocess, may be executed before, after, or in parallel with that other independent subprocess, even if the subprocesses are described or illustrated in a particular order.

Figure 2:
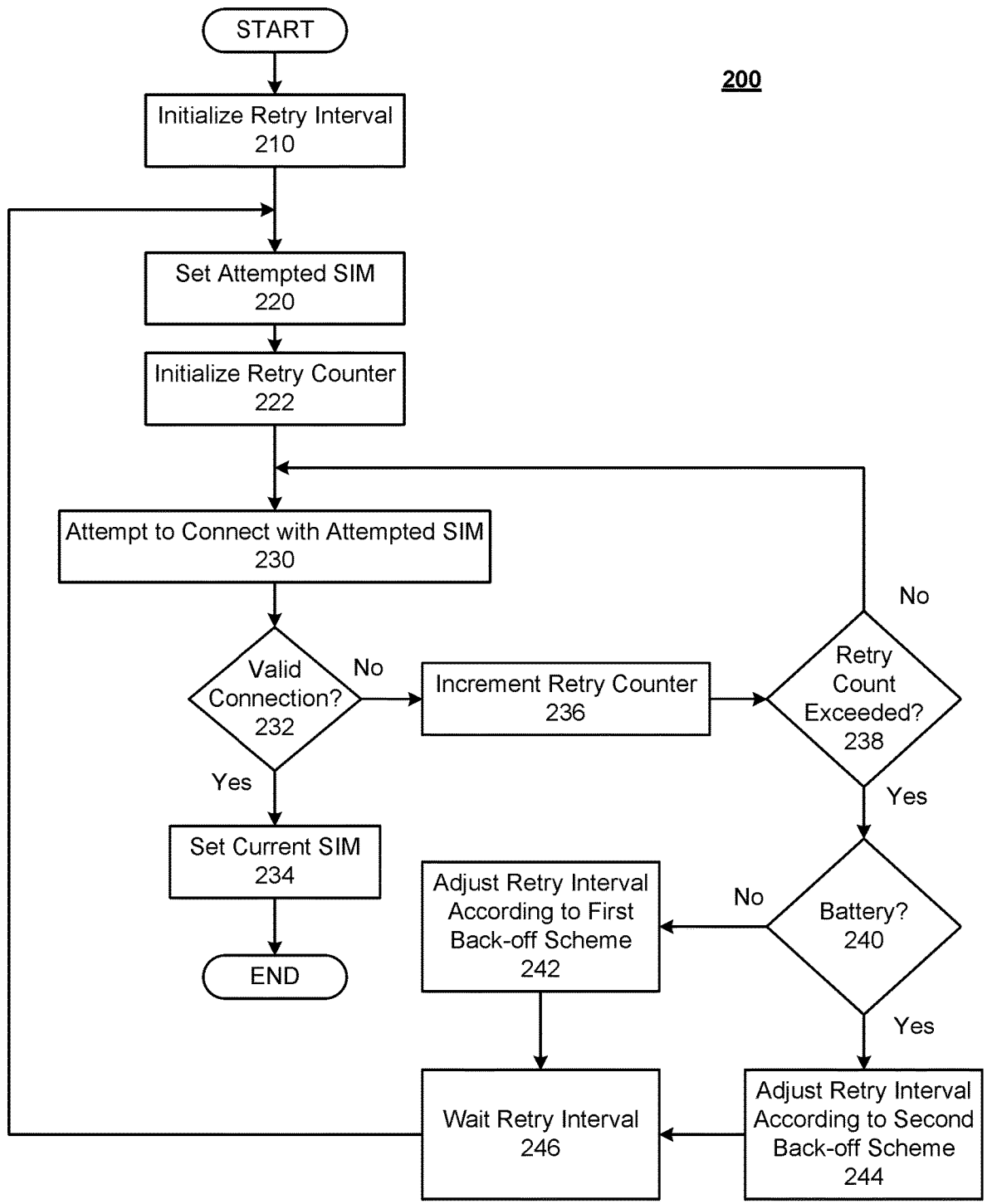
FIG. 2 illustrates an example battery-saving algorithm for retrying a connection to a wireless communication network, which may be executed by a telematic device, according to an embodiment.

FIG. 2 illustrates an algorithm 200 for attempting to connect to a wireless communication network in a manner that reduces battery consumption, according to an embodiment. Algorithm 200 may be performed by telematic device 100. In particular, in an embodiment in which algorithm 200 is implemented in software, algorithm 200 may comprise computer-executable code that is stored in secondary memory 125, loaded into main memory 120, and executed by processor(s) 110 of telematic device 100. An iteration of algorithm 200 may be performed in response to a determination to establish a connection to a wireless communication network using a new SIM profile. This determination may be triggered by any one or more events, including the failure or loss of a connection that utilizes the current SIM profile, a determination that the new connection is preferable based on one or more performance characteristics (e.g., signal-to-noise ratio (SNR), signal-to-interference-and-noise ratio (SINR), received signal strength indicator (RSSI), etc.), and/or the like. In particular, algorithm 200 may be initiated in response to a determination to switch from a first SIM profile to a second SIM profile. Typically, the second SIM profile will subscribe to a different wireless communication network, such that the switch from the first SIM profile to the second SIM profile involves a switch from a first connection to a first wireless communication network (or no connection if the connection to the first wireless communication network failed) to a second connection to a second wireless communication network. However, it is possible that the first and second SIM profiles could subscribe to the same wireless communication network, such that the switch from the first SIM profile to the second SIM profile involves a switch from a first connection to a wireless communication network to a second connection to the same wireless communication network.

In subprocess 210, one or more variables to be used by subsequent subprocesses of algorithm 200 may be initialized. For example, algorithm 200 may initialize a retry interval to an initial value. The initial value of the retry interval may be predefined (e.g., an initial value of 2) or may be set according to an algorithm, past retry interval, and/or the like. The initial value of the retry interval may be a constant value or may be configurable by an operator of telematic device 100. In either case, the retry interval may be stored in non-volatile memory (e.g., secondary memory 125).

Algorithm 200 also has access to a current SIM variable and a retry scale. The current SIM variable is set to an identifier of the last SIM profile (e.g., of a SIM card in a SIM slot 170, or of an eSIM) to be used for a valid connection. The current SIM variable may be stored in non-volatile memory (e.g., secondary memory 125). The retry scale represents the scale or unit of time of the retry interval. For example, the value of the retry scale may indicate seconds, minutes, hours, days, or the like. A default value of the retry scale may be predefined by a developer and may be configurable by an operator of telematic device 100. Alternatively, a value of the retry scale may be predefined by the developer and only modifiable via a software (e.g., firmware) update. In general, the value of the retry scale should be set lower (e.g., seconds, minutes, etc.) for more critical applications of telematic device 100 and set higher (e.g., hours, days, etc.) for less critical applications of telematic device 100.

In subprocess 220, the next SIM profile by which to attempt a connection is selected. For example, an attempted SIM variable may be set to an identifier of the selected SIM profile (e.g., of a SIM card in a SIM slot 170, or of an eSIM). The value of the attempted SIM variable may be stored in non-volatile memory (e.g., secondary memory 125).

In a telematic device 100 with only two SIM profiles (e.g., stored in two SIM cards in SIM slots 170A and 170B, or stored in a single eSIM or two distinct eSIMs), the next SIM profile may be selected as the opposite of the SIM profile represented by the current SIM variable in the first iteration of subprocess 220, and selected as the opposite of the SIM profile represented by the prior attempted SIM variable in any subsequent iteration of subprocess 220. In a telematic device with three or more SIM profiles, the next SIM profile may be selected according to a specified or default sequence or priority of SIM profiles. The sequence or priority of SIM profiles to be used for selection in subprocess 220 may be predefined by a developer and/or configurable by an operator. In any case, algorithm 200 cycles through available SIM profiles across iterations of subprocess 220. In an alternative embodiment or in the event that a certain SIM profile is required or desired (e.g., for a particular process to be performed by telematic device 100), the same SIM profile may be selected in each iteration of subprocess 220.

In subprocess 222, a retry counter is initialized. The value of the retry counter represents the number of attempts that have been made to connect using the SIM profile identified by the attempted SIM variable. The retry counter may be used with a threshold, representing a maximum number of retries (e.g., three), to cap the number of connection attempts during a cycle of subprocesses 230-238. While the retry counter will be described as counting up from zero to the threshold, it should be understood that the retry counter may be implemented in a different manner (e.g., by starting at the threshold and counting down to zero). The value of the retry counter may be stored in non-volatile memory (e.g., secondary memory 125).

In subprocess 230, an attempt is made to connect to a wireless communication network using the SIM profile identified by the current value of the attempted SIM variable. For example, processor 110 may control a wireless communications interface 160 (e.g., cellular communications interface 160A) to connect to a wireless communication network associated with the SIM profile identified by the attempted SIM variable. The connection attempt will result in either a valid connection (e.g., a usable connection) or an invalid connection (e.g., no connection or an unusable connection).

If a valid connection is detected (i.e., "Yes" in subprocess 232), the value of the current SIM variable is set to the value of the attempted SIM variable in subprocess 234. In other words, the current SIM variable is set to an identifier of the SIM profile with which a valid connection was acquired. Algorithm 200 then ends with a valid connection between telematic device 100 and the wireless communication network associated with the SIM profile identified by the current SIM variable. Telematic device 100 may perform normal operations using the new connection.

On the other hand, if no valid connection is detected (i.e., "No" in subprocess 232), the retry counter is incremented in subprocess 236. For example, in a typical implementation, the value of the retry counter may be incremented by one. In subprocess 238, the current value of the retry counter is compared to the threshold representing the maximum number of retries. If the value of the retry counter does not exceed the threshold (i.e., "No" in subprocess 238), algorithm 200 returns to subprocess 230 to perform another connection attempt with the same SIM profile. Otherwise, if the value of the retry counter exceeds the threshold (i.e., "Yes" in subprocess 238), algorithm 200 stops attempting a connection with the SIM profile, represented by the attempted SIM variable, and proceeds to subprocess 240.

In subprocess 240, it is determined whether or not terminal device 100 is operating on battery power. For example, algorithm 200 may detect the power state (e.g., line power or battery power) of terminal device 100 (e.g., by checking an output signal or variable indicative of the power state). If terminal device 100 is not operating on battery power (i.e., "No" in subprocess 240), algorithm 200 adjusts the retry interval according to a first back-off scheme in subprocess 242. On the other hand, if terminal device 100 is operating on battery power (i.e., "Yes" in subprocess 240), algorithm 200 adjusts the retry interval according to a second back-off scheme in subprocess 244. Generally, the second back-off scheme may be more aggressive than the first back-off scheme, since power consumption is of more concern when terminal device 100 is relying on battery power. It should be understood that a more aggressive back-off scheme increases the retry interval at a faster rate over iterations of cycle 220-246 than a less aggressive back-off scheme. Thus, a more aggressive back-off scheme reduces power consumption, relative to a less aggressive back-off scheme, by reducing the amount of connection attempts, thereby reducing the amount of power consumed by connection attempts.

In subprocess 242, the retry interval may be adjusted according to a first back-off scheme. In an embodiment, the first back-off scheme comprises incrementing the value of the retry interval by a constant amount (e.g., two). However, it should be understood that this is merely one example and that any back-off scheme may be used as the first back-off scheme. Other examples of the first back-off scheme include maintaining the value of the retry interval (i.e., incrementing the value of the retry interval by zero), incrementing the value of the retry value by a non-constant value according to a sequence or algorithm, or the like.

In subprocess 244, the retry interval may be adjusted according to a second back-off scheme that is more aggressive than the first back-off scheme. The second back-off scheme is more aggressive than the first back-off scheme in that the value of the retry interval increases at a faster rate, over iterations of cycle 220-246, according to the second back-off scheme than according to the first back-off scheme. For example, the second back-off scheme may comprise setting the value of the retry interval to the next number in the Fibonacci sequence or incrementing the value of the retry interval by the next number in the Fibonacci sequence. The Fibonacci sequence may be defined as:

$$F_n = F_{n-1} + F_{n-2}, n > 1, F_0 = 0, F_1 = 1$$

In an alternative embodiment, the second back-off scheme may utilize an algorithm other than the Fibonacci sequence, such as doubling the value of the retry interval or increment amount, squaring the value of the retry interval or increment amount, exponentially increasing the value of the retry interval or increment amount, and/or the like.

Once the retry interval has been adjusted according to either the first back-off scheme in subprocess 242 or the second back-off scheme in subprocess 244, algorithm 200 waits for the duration represented by the retry interval in the unit indicated by the retry scale. For example, if the value of the retry interval is five and the value of the retry scale is minutes, algorithm 200 will wait for five minutes in subprocess 246 until returning to subprocess 220. During the duration of subprocess 246, terminal device 100 may continue performing normal operations (e.g., other processes). However, in the event that algorithm 200 was triggered by a failed or lost connection, terminal device 100 may not have a valid connection with a wireless communication network, and therefore, may be incapable of performing normal operations that depend upon a valid connection with a wireless communication network.

It should be understood that, at a high level, algorithm 200 continually attempts to establish a valid connection, iterating over available SIM profile(s), until a valid connection is detected. At each iteration with a given SIM profile, algorithm 200 may repeatedly attempt to establish a connection until a threshold number of retries is reached. After the threshold number of retries is reached, algorithm 200 will adjust a retry interval according to a back-off scheme that depends on whether or not terminal device 100 is operating on battery power. A more aggressive back-off scheme is used when terminal device 100 is operating on battery power than when terminal device 100 is not operating on battery power. Thus, after each set of failed connection attempts, the retry interval may be increased, with more aggressive increases when terminal device 100 is operating on battery power, so as to reduce future battery consumption and extend battery life. After each retry interval, in the unit of time indicated by a retry scale, a different SIM profile may be selected (or, alternatively, the same SIM profile may be selected), and a connection is again attempted. This cycle repeats until a valid connection is established.

The above description of the disclosed embodiments is provided to enable any person skilled in the art to make or use the invention. Various modifications to these embodiments will be readily apparent to those skilled in the art, and the general principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

Combinations, described herein, such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, and any such combination may contain one or more members of its constituents A, B, and/or C. For example, a combination of A and B may comprise one A and multiple B's, multiple A's and one B, or multiple A's and multiple B's.

What is claimed is:

1. A telematic device comprising:
a battery;
a memory;
a cellular communications interface;
at least one hardware processor; and
software stored in the memory and configured to, when executed by the at least one hardware processor, in response to a determination to establish a connection, in each of one or more iterations,
attempt to connect to a wireless communication network via the cellular communications interface using a Subscriber Identity Module (SIM) profile, and,
when the attempt fails,
determine whether or not the telematic device is being powered by the battery,
when determining that the telematic device is not being powered by the battery, adjust a retry interval according to a first back-off scheme,
when determining that the telematic device is being powered by the battery, adjust the retry interval according to a second back-off scheme that increases the retry interval at a faster rate than the first back-off scheme, and
wait for a duration indicated by the retry interval until starting a next one of the one or more iterations.

2. The telematic device of claim 1, wherein attempting to connect to the wireless communication network comprises attempting to connect to the wireless communication until a valid connection is established or a maximum number of retries is reached.

3. The telematic device of claim 1, wherein the memory stores a value of a retry scale, and wherein the duration indicated by the retry interval is a value of the retry interval in a unit of time indicated by the stored value of the retry scale.

4. The telematic device of claim 3, wherein the value of the retry scale is configurable.

5. The telematic device of claim 1, wherein the software is further configured to, in each of the one or more iterations, select the SIM profile from a plurality of available SIM profiles prior to the attempt.

6. The telematic device of claim 5, wherein the one or more iterations are a plurality of iterations, and wherein, in at least one of the plurality of iterations, selecting the SIM profile comprises selecting a different one of the plurality of available SIM profiles than was selected in an immediately preceding one of the plurality of iterations.

7. The telematic device of claim 5, wherein, in an initial one of the one or more iterations, selecting the SIM profile comprises selecting a different one of the plurality of available SIM profiles than a last SIM profile to be used for a valid connection.

8. The telematic device of claim 1, further comprising at least two SIM slots, wherein each of the at least two SIM slots is configured to receive a SIM card that securely stores a SIM profile.

9. The telematic device of claim 1, further comprising an embedded SIM (eSIM) configured to securely store at least one SIM profile.

10. The telematic device of claim 1, wherein the first back-off scheme comprises incrementing a value of the retry interval by a constant amount.

11. The telematic device of claim 10, wherein the second back-off scheme comprises incrementing a value of the retry interval according to a Fibonacci sequence.

12. The telematic device of claim 1, wherein the second back-off scheme comprises incrementing a value of the retry interval according to a Fibonacci sequence.

13. A method comprising using at least one hardware processor to, in response to a determination to establish a connection, in each of one or more iterations:
attempt to connect to a wireless communication network via a cellular communications interface of a telematic device using a Subscriber Identity Module (SIM) profile; and,
when the attempt fails,
determine whether or not the telematic device is being powered by a battery,
when determining that the telematic device is not being powered by the battery, adjust a retry interval according to a first back-off scheme,
when determining that the telematic device is being powered by the battery, adjust the retry interval according to a second back-off scheme that increases the retry interval at a faster rate than the first back-off scheme, and
wait for a duration indicated by the retry interval until starting a next one of the one or more iterations.

14. The method of claim 13, wherein attempting to connect to the wireless communication network comprises attempting to connect to the wireless communication until a valid connection is established or a maximum number of retries is reached.

15. The method of claim 13, wherein the duration indicated by the retry interval is a value of the retry interval in a unit of time indicated by a stored value of a retry scale.

16. The method of claim 13, further comprising using the at least one hardware processor to, in each of the one or more iterations, select the SIM profile from a plurality of available SIM profiles prior to the attempt.

17. The method of claim 16, wherein, in an initial one of the one or more iterations, selecting the SIM profile comprises selecting a different one of the plurality of available SIM profiles than a last SIM profile to be used for a valid connection.

18. The method of claim 13, wherein the first back-off scheme comprises incrementing a value of the retry interval by a constant amount.

19. The method of claim 13, wherein the second back-off scheme comprises incrementing a value of the retry interval according to a Fibonacci sequence.

20. A non-transitory computer-readable medium having instructions stored therein, wherein the instructions, when executed by a processor, cause the processor to:
attempt to connect to a wireless communication network via a cellular communications interface of a telematic device using a Subscriber Identity Module (SIM) profile; and,
when the attempt fails,
determine whether or not the telematic device is being powered by a battery,
when determining that the telematic device is not being powered by the battery, adjust a retry interval according to a first back-off scheme,
when determining that the telematic device is being powered by the battery, adjust the retry interval according to a second back-off scheme that increases the retry interval at a faster rate than the first back-off scheme, and wait for a duration indicated by the retry interval until starting a next one of the one or more iterations.

\* \* \* \* \*